United States Patent
Yang et al.

(10) Patent No.: US 6,505,089 B1
(45) Date of Patent: Jan. 7, 2003

(54) METHOD FOR MANUFACTURING A THREE-DIMENSIONAL MODEL BY VARIABLE DEPOSITION AND APPARATUS USED THEREIN

(75) Inventors: Dong Yol Yang, Taejun (KR); Bo Sung Shin, Taejun (KR); Jun Ho Jeong, Taejun (KR)

(73) Assignee: Korea Advanced Institute Science and Technology, Taejun (KR)

( * ) Notice: Subject to any disclaimer, the term of this patent is extended or adjusted under 35 U.S.C. 154(b) by 0 days.

(21) Appl. No.: 09/524,153

(22) Filed: Mar. 14, 2000

(30) Foreign Application Priority Data

Mar. 15, 1999 (KR) .............................................. 99-8594

(51) Int. Cl.⁷ .............................................. G06F 19/00
(52) U.S. Cl. .......................................... 700/98; 264/308
(58) Field of Search ..................... 700/97, 98, 118–119, 700/163; 264/308

(56) References Cited

U.S. PATENT DOCUMENTS

| | | | | |
|---|---|---|---|---|
| 4,752,352 A | | 6/1988 | Feygin | 216/33 |
| 5,121,329 A | * | 6/1992 | Crump | 700/119 |
| 5,257,657 A | * | 11/1993 | Gore | 164/46 |
| 5,398,193 A | * | 3/1995 | deAngelis | 700/119 |
| 5,402,351 A | * | 3/1995 | Batchelder et al. | 700/119 |
| 5,594,652 A | * | 1/1997 | Penn et al. | 700/119 |
| 5,738,817 A | | 4/1998 | Danforth et al. | 264/603 |
| 5,879,489 A | * | 3/1999 | Burns et al. | 156/234 |
| 5,997,681 A | * | 12/1999 | Kinzie | 156/256 |
| 6,021,358 A | * | 2/2000 | Sachs | 700/98 |
| 6,129,872 A | * | 10/2000 | Jang | 264/75 |

* cited by examiner

Primary Examiner—Leo Picard
Assistant Examiner—Zoila Cabrera
(74) Attorney, Agent, or Firm—Akin, Gump, Strauss, Hauer & Feld, L.L.P.

(57) ABSTRACT

To enhance accuracy of the size and the shape of manufactures, and to shorten the time of operation, there is provided a method for manufacturing a 3D model comprising steps of designing the 3D model and collecting shape data of the 3D model slicing the 3D model into several layers in height, dividing each of the layers into several sublayers so that a sublayer is formed by depositing a material at once, depositing a material in accordance with shape data in relation to a sublayer divided from one layer of the 3D model, and deciding whether the one layer of the 3D model has been completed. The method is conducted using computer-aided design and computer aided manufacturing system including a variable deposition manufacturing apparatus. The apparatus comprises a material feeder 11, an electrical melting device 13 connected to the material feeder 11 through a conduit 12, a variable nozzle 15 connected to the variable nozzle 15 through a flow controller 14, a three-dimensional moving mechanism for moving the variable nozzle is in relation to the 3D model and a turntable adapted for rotating the 3D model.

15 Claims, 6 Drawing Sheets

METHOD FOR MANUFACTURING A THREE-DIMENSIONAL MODEL BY VARIABLE DEPOSITION AND APPARATUS USED THEREIN

SUBSTITUTE SPECIFICATION

Method for Manufacturing a Three-Dimensional Model by Variable Deposition and Apparatus Used Therein

TECHNICAL FIELD

This invention relates to manufacturing a three-dimensional model (3D model) such as a prototype and a mold, more particularly, to development of variable deposition manufacturing.

BACKGROUND OF THE INVENTION

One of prevailing method of manufacturing a 3D model comprises shaping a high formative material such a liquid or soft material into a configuration of the 3D model, and then setting the configuration by solidifying the material. Another comprises forming a configuration of the 3D model by depositing a powdered or sheeted material.

Herein, "Solid Freeform Fabrication (SFF)" means that manufacturing a 3D model from a metal or non-metal material such as paper, wax or plastic resin by depositing the material with controlled in real time by three-dimensional computer-aided design (3D CAD) data. Recently, various materials including metal powder and metal wire are usable in VDM.

One of conventional SFF is a stereolithography in which repeated are steps of depositing a photopolymer in liquid by a depth of layer, and solidifying at least several portions of the photo-polymer. In the stereolithography, solidification of each layer is conducted by locally shooting a laser beam, or generally illuminating light emitted from an ultraviolet lamp. After forming a desired shape of 3D model with a plurality of solidified layers, the photopolymer should be set. However, the photopolymer may contract, as it is set, whereby the shape of 3D model is distorted. If the 3D model has an elongate extension, furthermore, since the extension formed of solidified polymer before setting may drop down due to weight of itself, it is required to support it by a pole. Moreover, most kinds of photopolymer have not enough strength even after setting to be used in an operational constituent.

SFF using a powdered material can be exemplified by a selective laser sintering (SLS) method, which is used by DTM Co., and a three-dimensional printing (3D printing) method, which is used by SOLINGEN Co. and Z Corp.

The SLS method comprises depositing a layer of plastic powder, and fusing the plastic powder by shooting a laser beam. The SLS method is often used in manufacturing a metal article or a mold from metal powder with plastic material coated thereon.

The SLS method needs steps of removing the plastic material from the metal powder, and then sintering the metal powder to be merged into one body. Furthermore, it requires an additional step of infiltrag melted copper into gaps among grains of metal powder. There may be contraction and/or deformation due to heat during copper infiltrating, whereby it is very difficult to get the precise size of the article or mold.

The 3D printing method comprises depositing a layer of powdered material, and then selectively applying a combining agent in liquid thereon. The 3D printing method is used in manufacturing a ceramic shell from ceramic powder, which shell is used in investment casting. The 3D printing method is also used in manufacturing an article from starch powder.

The 3D printing method needs a post-processing step for increasing the density and the strength. During the post-processing step, there must be thermo-contraction and/or thermo-deformation.

SFF using a layered material is realized with a laminated object manufacturing (LOM) method, which is used by HELISYS Co. The LOM method comprises adhering laminated papers using a heated roller, and the cutting out the papers by a laser beam. Although the LOM method uses paper that is a relatively cheep material, it takes very much time to draw out a finished 3D model or article from a bulk of refuse. In other words, when manufacturing a sphere, it is very bothersome to remove wastes surrounding the sphere after completing to forming it.

These shortcomings are still remained in SFF using plastic laminates, which are recently developed.

STRATASYS Co. uses a fused deposition modeling (FDM) method, which comprises passing a plastic filament through a heat nozzle, which has a similar shape with an extruding mold, so that the filament is melted and cohered. A model or article is very rough because of beads of melted plastic filament.

Hereinafter, SFF for a structural member of metal or a metal mold will be explained.

A laser engineered net shaping (LENS) method developed by SANDIA NATIONAL Lab. and practiced by OPTOMEC Co. comprises partially heating a metal substrate by a laser beam to a melt pool, and then depositing metal powder dispersed in a gaseous body.

The LENS method cannot guarantee a precise size because of deformation on solidifying the melt. Furthermore, it is not able to apply the LENS method to manufacturing an article having protrusions or cantilevers, which cannot receive the melt pool.

A shape deposition manufacturing (SDM) method developed by STANFORD Univ. and CARNEGIE MELLON Univ. comprises a metal depositing step and a computer numerical control (CNC) machining step. The SDM method is practiced by depositing a metal melt on a portion, machining to obtain desired thickness and shape by multi-poled CNC milling, depositing a metal melt on another portion, machining again to obtain desired thickness and shape, and then alternately repeating operations of depositing and machining to complete a layer of metal. After completing the layer of metal, shot peening is conducted to relieve remaining stress. These operations are repeated up to forming a wanted shape. Because of these repeated operations, it takes very much time to manufacture a 3D model using the SDM method.

SUMMARY OF THE INVENTION

This invention proposes a novel method for practicing the variable deposition manufacturing (VDM).

The inventive method significantly enhances accuracy of the size and the shape of manufactures, and shortens the time of operation. The method comprises depositing a metal or non-metal material melted by an electrical melting device under the control of a variable nozzle, which has variable thickness, variable width and variable inclination.

According to this invention, a method for manufacturing a 3D model is provided. The method comprises steps of designing the 3D model and collecting shape data of the 3D model slicing the 3D model into several layers with thickness in height, dividing each of the layers into several sublayers so that a sublayer is formed by depositing a material at once, depositing a material using variable nozzle in accordance with shape data in relation to a sublayer divided from one layer of the 3D model, and deciding whether the one layer of the 3D model has been completed. If the result of decision is "NO", the aforementioned steps are repeated for another sublayer divided from the one layer of the 3D model. If the result of decision is "YES", it is decided whether the 3D model has been completed. If the result of decision is "NO", the aforementioned steps are repeated for another layer sliced from the 3D model until the 3D model is completed.

The method may further comprise steps of deciding whether any sublayer has to be supported by a support, and if a sublayer requires a support, positioning the support and adding shape data of the support to the shape data of the 3D model.

According to another aspect of this invention, there is provided a computer-aided design and computer aided manufacturing system used in manufacturing a 3D model by depositing a material in accordance with shape data of the 3D model using a variable deposition manufacturing apparatus that comprises a material feeder, an electrical melting device, a variable nozzle 15 moved by a three-dimensional moving mechanism, and a turntable adapted for rotating the 3D model. The system comprises a main processor for designing the 3D model and collecting shape data of the 3D model, slicing the 3D model into several layers with thickness in height, and dividing each of the layers into several sublayers so that a sublayer is formed by depositing a material at once, a material-feeding controller for controlling the material feeder to adjust the quantity of material fed to the electrical melting device, a nozzle controller for controlling a material ejection from the variable nozzle, a model position controller for controlling operation of the three-dimensional moving mechanism, and the main processor adapted for transmitting the shape data to the material-feeding controller, the nozzle controller and the model position controller so that these three controllers cooperate to form the 3D model.

According to another aspect of this invention, there is provided a variable deposition manufacturing apparatus used in manufacturing a 3D model by depositing a material using a variable nozzle in accordance with shape data of the 3D model. The apparatus comprises a material feeder for feeding a material used in forming the 3D model, an electrical melting device for melting the material, the electrical melting device connected to the material feeder through a conduit, a variable nozzle adapted for depositing the melted material in accordance with shape data of the 3D model, the variable nozzle connected to the variable nozzle through a flow controller, a three-dimensional moving mechanism for moving the variable nozzle in relation to the 3D model, and a turntable adapted for rotating the 3D model.

The apparatus may consist of one or more depositing lines, in which each of the depositing lines has the material feeder, the electrical melting device and the variable nozzle, respectively.

It is preferred that the apparatus further comprises a nozzle heater for preventing a melt in the variable nozzle from being solidified.

The three-dimensional moving mechanism may comprise a slider moved on a Y-directional rail, the first slide adapted to clamp the variable nozzle thereto, a pair of sliders moved on a pair of X-directional rails, the pair of sliders moving the Y-directional rail in X-direction, and one or more sliders moved on one or more Z-directional rails, the one or more sliders moving the turntable in Z-direction.

Preferably, the variable nozzle consists of two parts and connected by a pivot with each other, in which a downstream part of the two parts is adapted to around the pivot to adjust an angle in relation with an upstream part of the two parts, by which an ejection angle of the downstream part is adjusted.

The downstream part of the variable nozzle may comprise a thickness-adjusting panel adapted to be moved upward or downward to adjust the thickness of material ejected from the downstream part, two width-adjusting panels adapted to be moved rightward or leftward to define right and left ends of an outlet of the downstream part of the variable nozzle, and two slope-adjusting panels adapted for defining slopes of the right and left ends of the outlet of the downstream part.

BRIEF DESCRIPTION OF THE DRAWINGS

Several preferred embodiments of a method for manufacturing a 3D model in accordance with the present invention will be explained with reference to the accompanying drawings, in which.

DETAILED DESCRIPTION OF THE INVENTION

Figure 1:
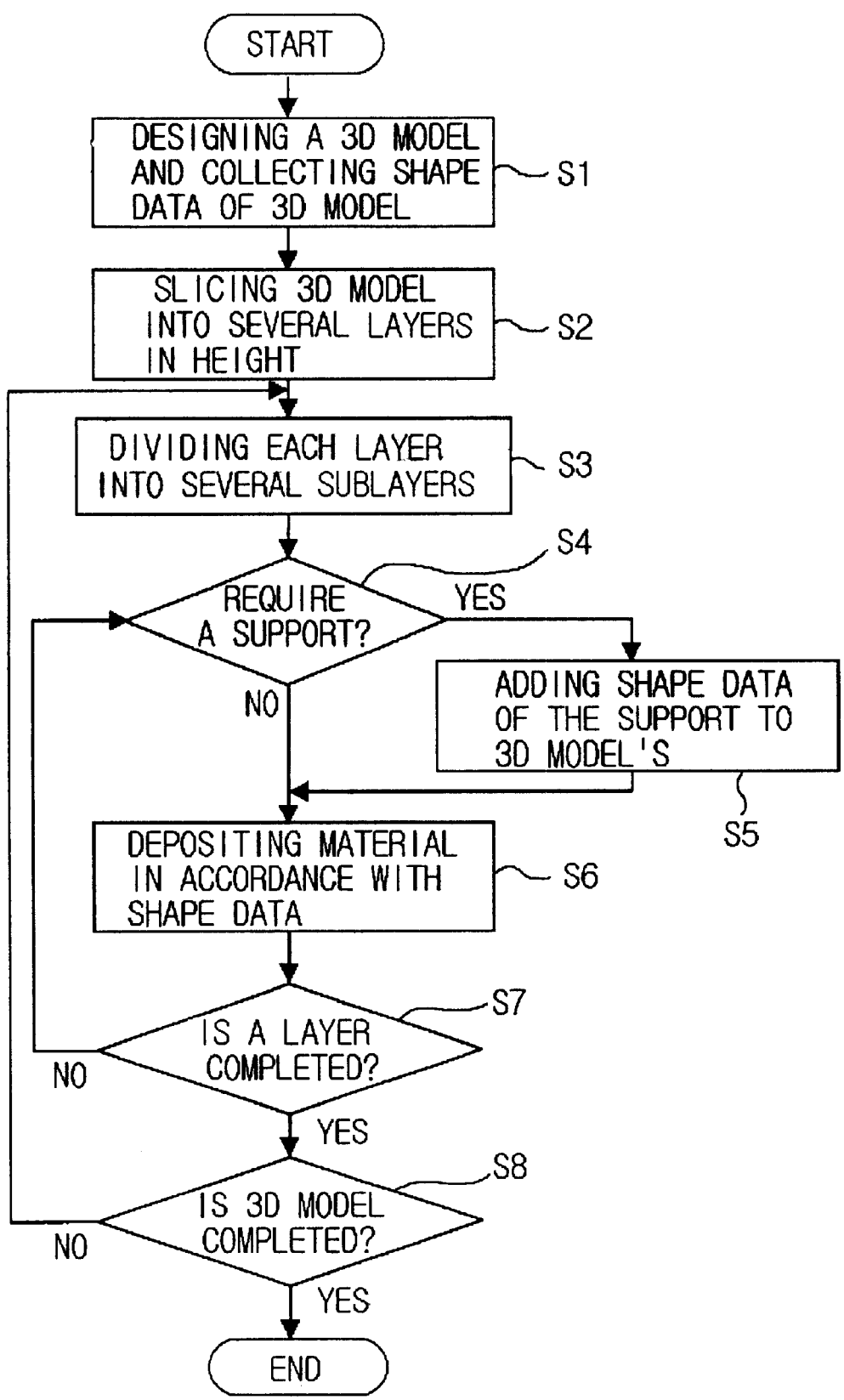
FIG. 1 shows a flowchart of operations in VDM according to an embodiment of this invention.

As shown in FIG. 1, a method for manufacturing a 3D model in accordance with a preferred embodiment of this invention is proceeded by following steps.

Firstly, a wanted 3D model such as a prototype and a mold is designed, and shape data of the 3D model are collected at Step 1, i.e. S1 in FIG. 1. The 3D model having variable thickness, variable width and variable slope in general is sliced into several layers at Step 2, and then each of the layers is furthermore divided into several sublayers at Step 3. At Step 4, it is decided whether any sublayer has to be supported by a support. If a sublayer requires a support, positioning the support and adding shape data of the support to the shape data of the 3D model at Step 5. Then, a material is deposited in accordance with the shape of the associated sublayer at Step 6. At Step 7, it is decided whether one of the layers sliced from the 3D model is completed. If the result of decision is "NO", Steps 4 through 7 are repeated for another of remained sublayers included in the associated layer. If the result of decision is "YES", at Step 7, it is decided whether the 3D model is completed at Step 8. If the result of decision is "NO", Steps 3 through 8 are repeated for another of remained layers of the 3D model until the 3D model is completed.

Figure 3:
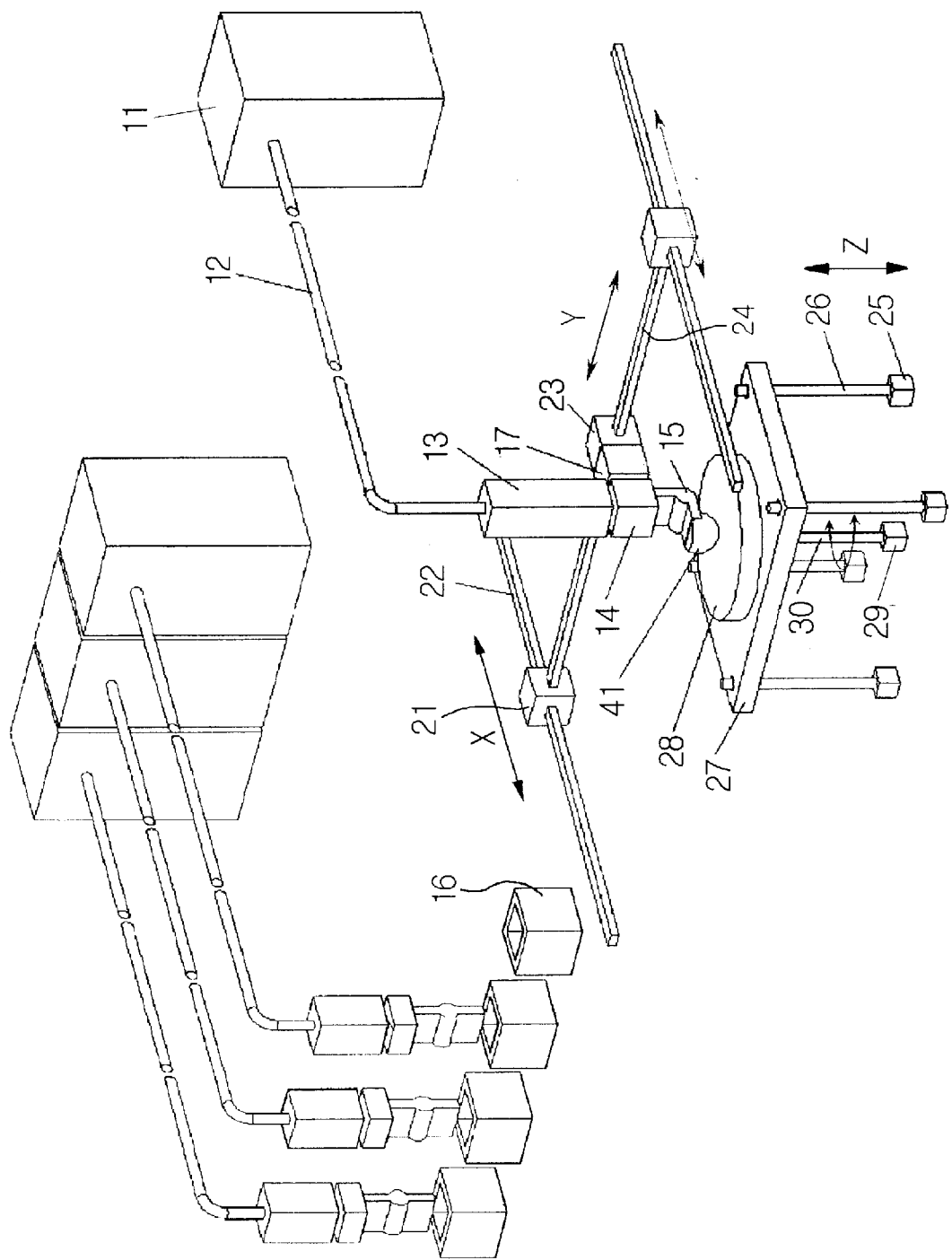
FIG. 3 shows a perspective view of a VDM apparatus having the functional blocks shown in FIG. 2.

The method for manufacturing a 3D model is conducted using a VDM apparatus as shown in FIG. 3.

The VDM apparatus comprises a material feeder 11, in which either a non-metal material such wax or plastic resin, or a metal material is reserved. A solid material shaped in wire or pellet is preferably used.

The material reserved in the material feeder 11 is fed through a conduit 12 to an electrical melting device 13. The material may be a non-metal simplex, a metal simplex or a complex consisting of any two or more simplexes. Preferably, the conduit 12 is made of an elastic and flexible member.

The electrical melting device 13 is constructed to receive the material fed from the material feeder 11, to melt it, and to reserve a quantity of melt.

A pump is provided to supply the melt to a variable nozzle 15. A flow controller 14 electrically controls the pump to adjust the quantity of the melt supplied to the variable nozzle 15.

In this embodiment, the VDM apparatus comprises four depositing lines, in which each of the depositing lines has the material feeder 11, the conduit 12, the electrical melting device 13, the flow controller 14 and the variable nozzle 15, respectively.

Upon manufacturing a 3D model, each of the depositing lines plays a role in each step shown in FIG. 1. For example, two of the four depositing lines deposit a material for shaping the 3D model, while the other two of the four depositing lines deposit a material for shaping a support if it is required to support any part of the 3D model. It is preferred that the material for shaping a support is easily removed from the material for shaping the 3D model. The number of depositing lines is not limited to four, but also can be decreased or increased.

A nozzle heater 16 is provided under the variable nozzle 15 so that the melt in the variable nozzle 15 is prevented from being solidified.

The VDM apparatus has a three-dimensional moving mechanism that moves the variable nozzle 15 associated with one of four depositing lines in X, Y and Z-directions.

In this embodiment, the variable nozzle 15 clamped to the moving mechanism is moved in X-direction by a pair of sliders 21 on a pair of X-directional rails 22, and in Y-direction by a slider 23 on a Y-directional rail 24. As for Z-direction, a shelf 27, on which a growing 3D model is supported, is moved rather than the variable nozzle 15 is moved. In other words, the shelf 27 is moved in Z-direction by four sliders 25 on four Z-directional rails 26 after the variable nozzle 15 completes formation of a part of the 3D model. The slider 23 has a holder 17 adapted to be connected to the flow controller 14 associated with one of four depositing lines.

A rotating shaft 30 connected to a motor 29 rotates a turntable 28 installed on the shelf 27. The 3D model grows on the turntable 28 by continuously depositing a material on its incomplete body rotated with the turntable 28.

Figure 4:
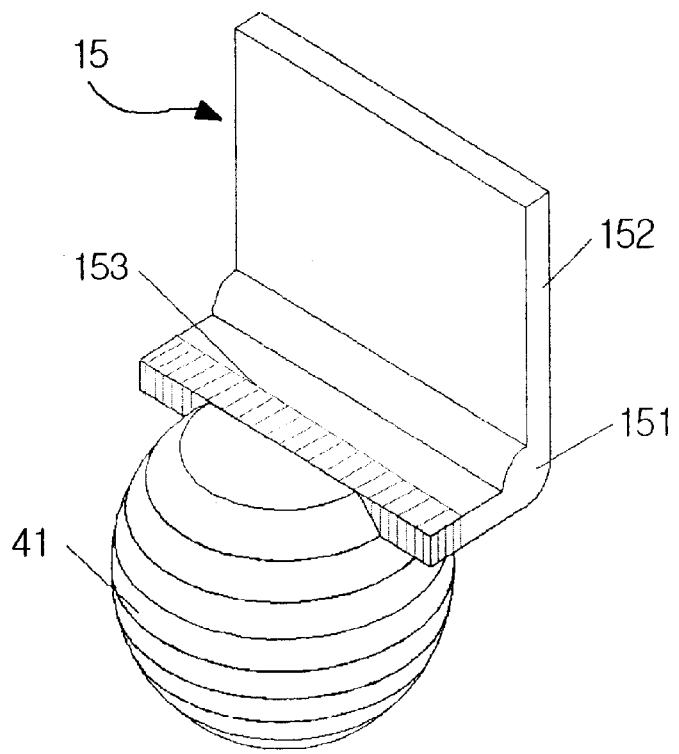
FIG. 4 shows an enlarged perspective view of a variable nozzle of the VDM apparatus shown in FIG. 3 along with a growing 3D model.

As shown in FIG. 4, the variable nozzle 15 consists of two parts 152 and 153 connected by a pivot 151 with each other. A downstream part 153 can be swung around the pivot 151 to adjust an angle in relation with an upstream part 152, by which an ejection angle of the downstream part 153 is adjusted.

Figure 5:
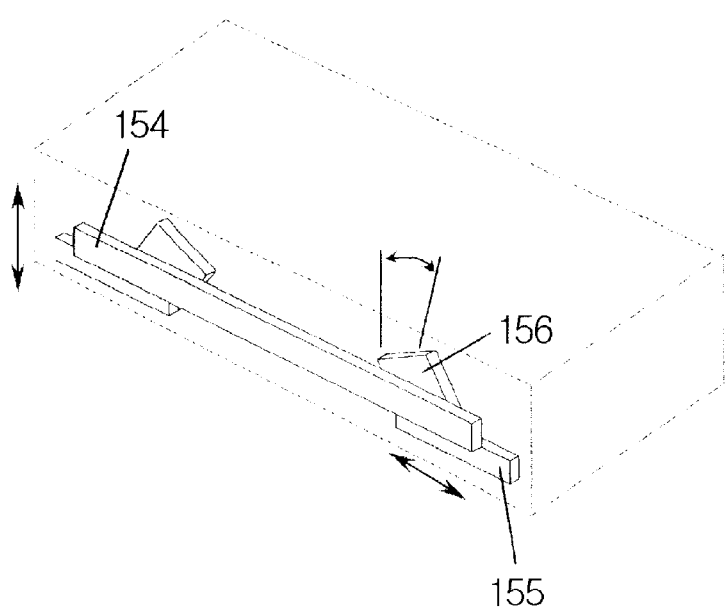
FIG. 5 shows an enlarged perspective view of a downstream part of the variable nozzle shown in FIG. 4.

As shown in FIG. 5, at the tip of the downstream part 153 of the variable nozzle 15, a thickness-adjusting panel 154, two width-adjusting panels 155 and two slope-adjusting panels 156 are installed. The thickness-adjusting panel 154 can be moved upward or downward to adjust the thickness of material ejected from the downstream part 153 of the variable nozzle 15. The two width-adjusting panels 155 define right and left ends of an outlet of the downstream part 153 of the variable nozzle 15 and can be moved rightward or leftward so that the width of material ejected from the downstream part 153 is adjusted. The two slope-adjusting panels 156 define slopes of right and left ends of an outlet of the downstream part 153 and can be moved rightward or leftward as the two width-adjusting panels 155 are moved rightward or leftward. The thickness-adjusting panel 154, the two width-adjusting panels 155 and the two slope-adjusting panels 156 cooperate to control material ejection from the do team part 153.

Figure 2:
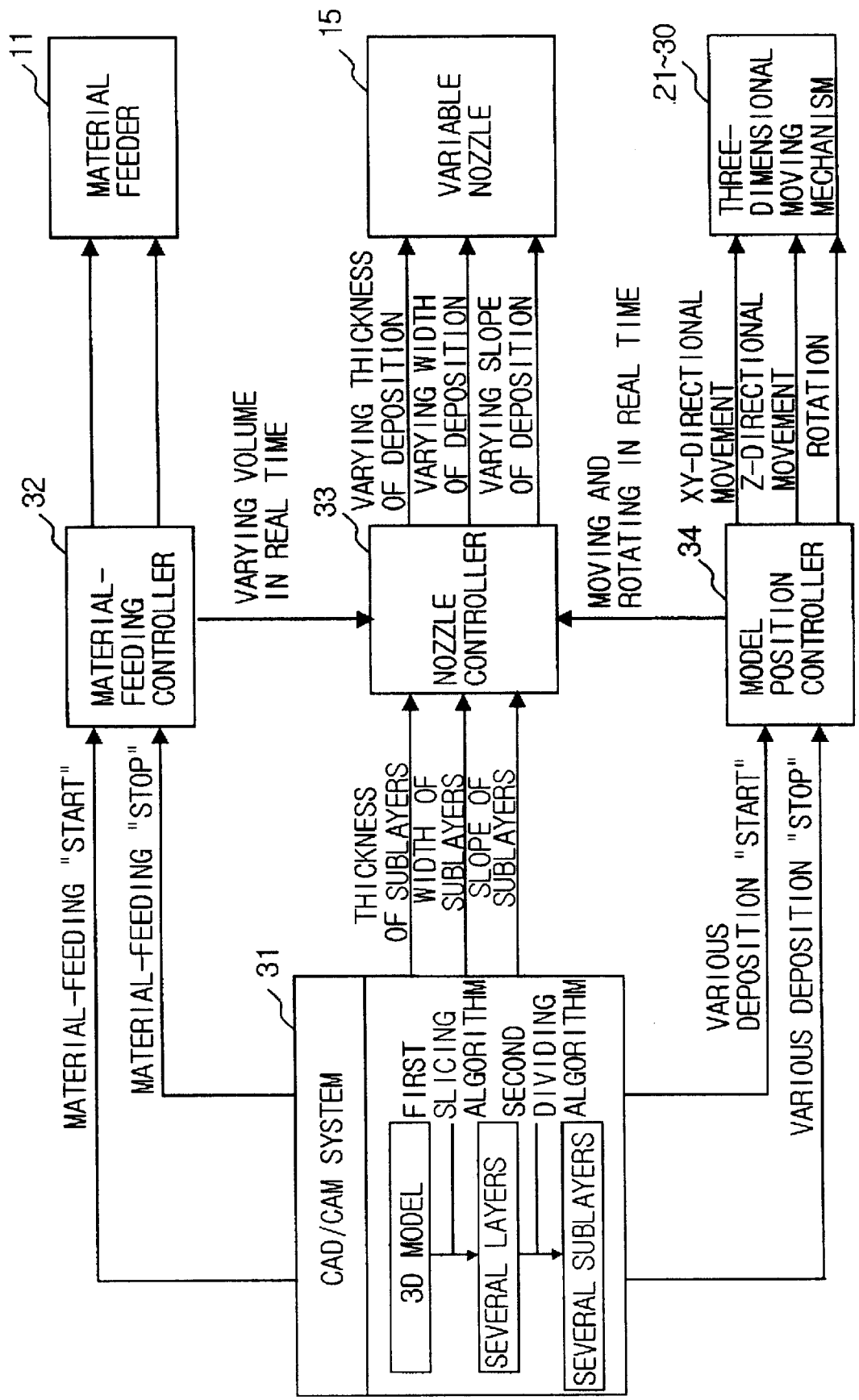
FIG. 2 shows a block diagram for mapping the operations on functional blocks of an apparatus used realizing the VDM shown in FIG. 1.

Referring to FIG. 2, it will be explained how the 3D model manufacturing method shown in FIG. 1 is conducted using the VDM apparatus shown in FIGS. 3 through 5.

The VDM apparatus is incorporated into a computer-aided design and computer aided manufacturing system (CAD/CAM system) 31 used in manufacturing a 3D model. As shown in FIG. 2, the CAD/CAM system 31 has a main processor that is embodied in general as a computer, and further comprises a material-feeding controller 32, a nozzle controller 33 and a model position controller 34.

Steps 1 through 3 shown in FIG. 1 are conducted at the main processor of the CAD/CAM system. In other words, an operator designs a wanted 3D model, slices the designed 3D model into several layers, and divides a layer of the 3D model into several sublayers at the main processor of the CAD/CAM system 31. The main processor of the CAD/CAM system 31 decides whether any layer and/or sublayer requires a support at Step 4 shown in FIG. 1.

Figure 6:
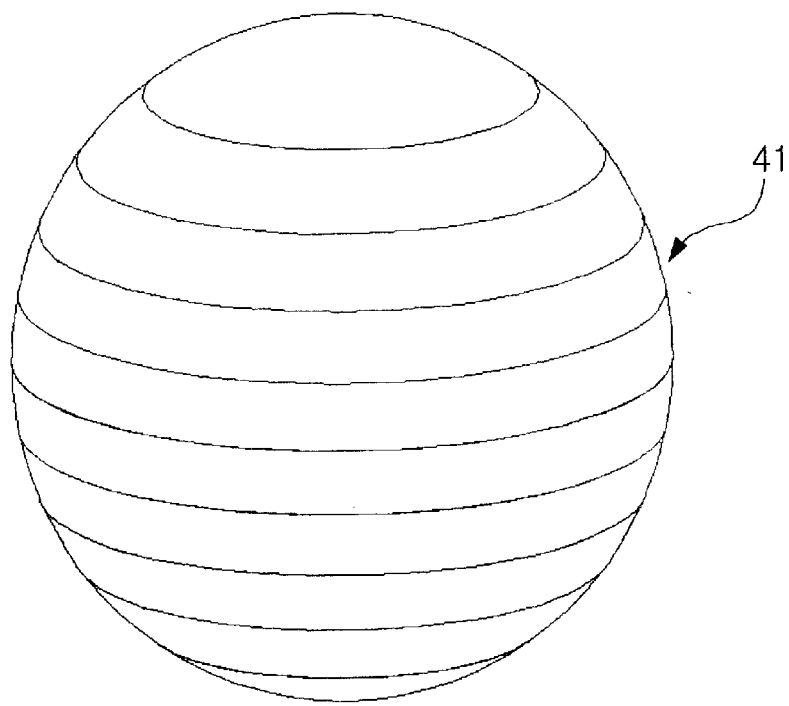
FIG. 6 shows a sphere as a 3D model to be manufactured according to this invention.
Figure 7:
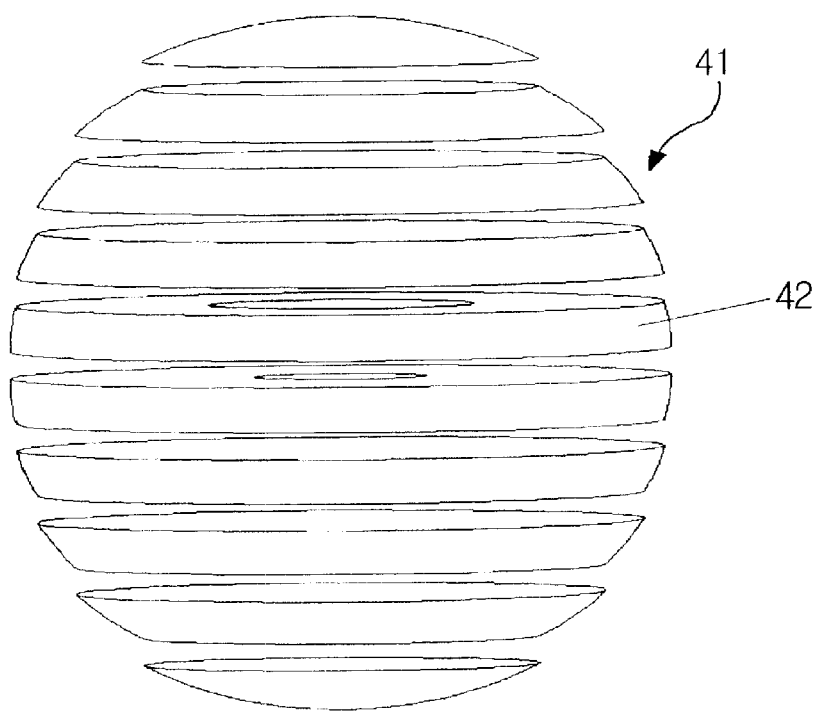
FIG. 7 shows the sphere shown in FIG. 6 in state sliced into several layers with thickness.
Figure 8:
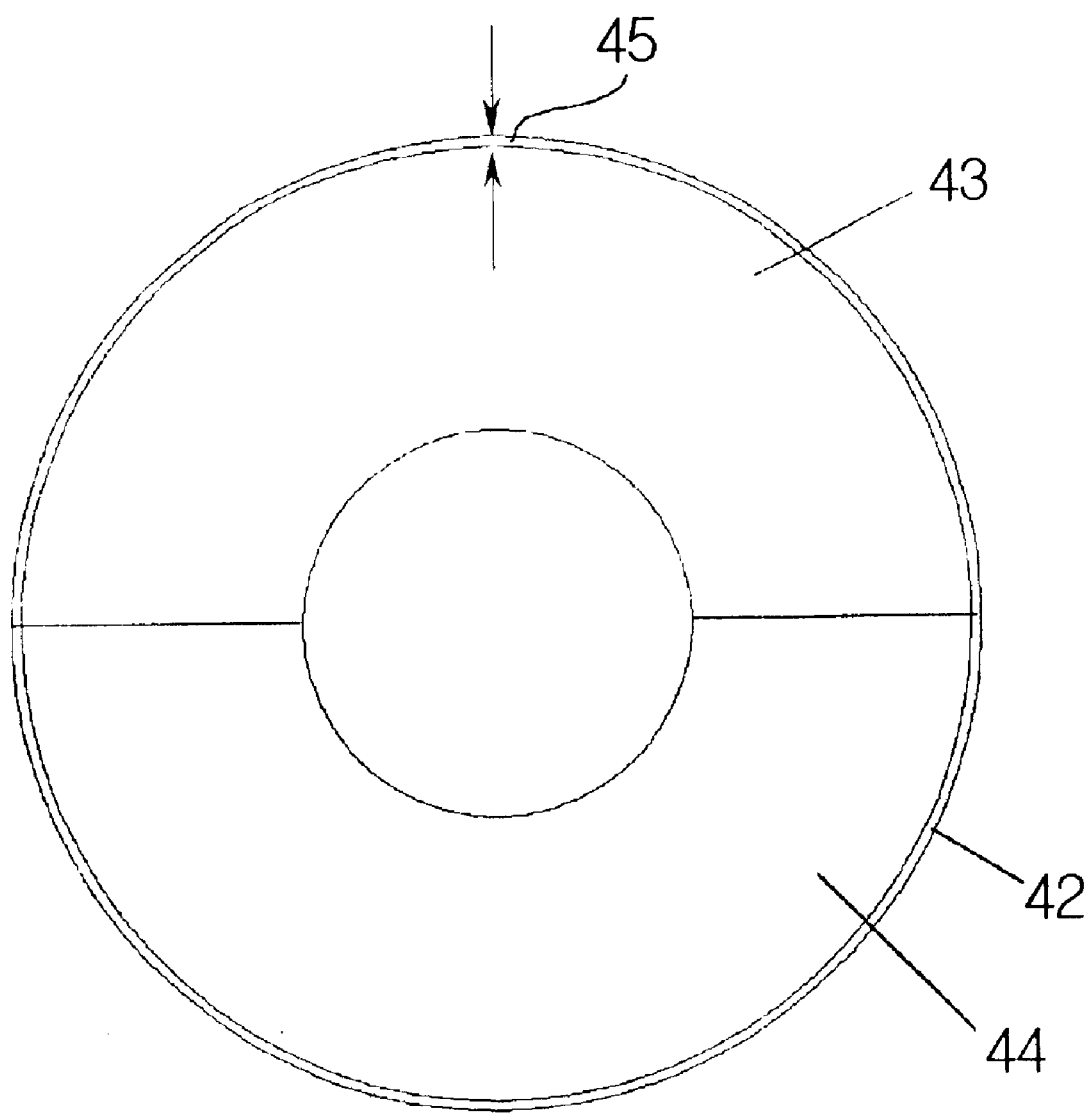
FIG. 8 shows a layer of the sphere shown in FIG. 6 in state divided into several sublayers.

More particularly, when manufacturing a sphere 41 as shown in FIG. 6, the sphere 41 is sliced into several layers in height so that each layer has an adequate thickness. Then, data on the shape of each layer 42 shown in FIG. 7 are calculated.

Each layer 42 having approximately a shape of disk is divided into several sublayers 43 and 44 based on the shape data considering the deposition capability of the variable nozzle 15 of the VDM apparatus. The disked layer 42 shown in FIG. 7 is grown by depositing a material in its radial direction, as the layer 42 supported on the turntable 28 is rotated. However, it may be impossible to deposit a material to complete the exterior shape of each layer in all directions at once, if the outmost shape such as depth, width and slope is not even. Accordingly, a sublayer should have the shape that can be completed at once.

The main processor of the CAD/CAM system transmits the shape data to the material-feeding controller 32, the nozzle controller 33 and the model position controller 34. The material-feeding controller 32, the nozzle controller 33 and the model position controller 34 cooperate to form a sublayer of the 3D model having adequate width, depth and slope at an adequate position on the turntable 28 by depositing a material using the variable nozzle 15 at once. The height and the rotating angle of the turntable 28, and the position, the thickness, the width and the slope of material ejected from the variable nozzle 15 are controlled in real time.

More particularly, the material-feeding controller 32 controls the quantity of material fed from the material feeder 11. The nozzle controller 33 controls the angle of the downstream part 153, the position of the thickness-adjusting panel 154 and the two width-adjusting panels 155, and the angle of the two slope-adjusting panels 156 to adjust the position, thickness, width and slope of material ejected from the variable nozzle 15. The model position controller 34 controls the moving mechanism, i.e., the sliders 21 on the X-directional rails 22, the slider 23 on the Y-directional rail 24, the sliders 25 on the Z-directional rails 26, and the motor 30 connected to the turntable 28 through the rotating shaft 30 to adjust the height, the position and rotation of a growing 3D model on the turntable 28.

Under the aforementioned controls of the material-feeding controller 32, the nozzle controller 33 and the model position controller 34, the material feeder 11 feeds the material in wire or pellet through the flexible conduit 12 to the electrical melting device 13. The electrical melting device 13 melts the material and passes an adequate quantity of melt through the flow controller 14 to the variable nozzle 15. The variable nozzle 15 deposits the melt to grow an associated sublayer 43 or 44 of the 3D model while the nozzle controller 33 controls the thickness-adjusting panel 154, the width-adjusting panels 155 and the slope-adjusting panels 156 in real time. If the main processor of the CAD/CAM system 31 decided that the associated sublayer 43 or 44 of the 3D model should be supported by a support, the support is simultaneously formed from another material using another variable nozzle at Step 5 shown in FIG. 1. The support is also sliced into several layers in height as the 3D model is.

At Step 7 shown in FIG. 1, it is decided whether the associated layer 42 has been completed. If the result of decision is "NO", one of the remained sublayers 43 or 44 of the associated layer 42 is grown by further depositing a material under the control as aforementioned. If the result of decision is "YES", at Step 8, it is decided whether the 3D model has been completed. If the result of decision is "NO", one of the remained layers 41 of the 3D model is grown by further depositing a material under the control as aforementioned after the shelf 27 is lowered by a unit of height using the sliders 25 on the Z-directional rail 26.

The inventive VDM method differs from the conventional LOM method and the conventional FDM method in respects shown in Table 1.

Table 1: Differences Among VDM, LOM and FDM Methods

TABLE 1

Differences Among VDM, LOM and FDM Methods

| Item | Conventional LOM | Conventional FDM | Inventive VDM |
| --- | --- | --- | --- |
| Material | Paper | Wax, ABS, MABS | Any fusible material |
| Binding | Bonding agent applied on paper | Electrical melting | Electrical melting |
| Formation Unit | Area having very small depth (0.1067 mm) | Only a thread (φ 0.33 mm) | Area having relatively large thickness (more than 1 mm) |
| Formation Width Variability | Non-controllable on depositing | Non-controllable on depositing | Controllable on depositing in real time |
| Slope | Formation in | Formation in | Smooth slope |

TABLE 1-continued

Differences Among VDM, LOM and FDM Methods

| Item | Conventional LOM | Conventional FDM | Inventive VDM |
| --- | --- | --- | --- |
| Formation | stepwise slope | stepwise slope | controlled in real time |
| Deposition Depth | Corresponding to paper thickness | Corresponding to thread thickness | Controllable on depositing in real time |
| Deposition Volume | Area by paper thickness | Length by thread thickness | Controllable on depositing in real time |
| Operating Condition | Laboratory or factory | Laboratory or indoor space | Laboratory or factory |

The inventive VDM method has following advantages in comparison with the conventional LOM method and the conventional FDM method.

Firstly, since there is no limitation on selection of material, any materials or any compositions can be co-used only if they are compatible.

Secondly, depositing a material in completely melted state results in forming an even organization around a deposition boundary.

Thirdly, the width of material ejection is controlled in real time, by which a very complex shape of a 3D model is easily manufactured.

Fourthly, the slope of material ejection is controlled in real time, by which a finished 3D model has very precise geometric appearance.

Fithly, the thickness of material ejection is controlled in real time, by which it takes very shortened time to manufacture a 3D model.

This invention is applied to manufacturing a three-dimensional model (3D model) such as a very complex prototype and a very complex mold used in the automobile industry, the aircraft industry, the electronic industry, the extrusion industry and the medical appliance industry. This invention is very useful in manufacturing a functional article of hybrid materials in a little batch.

Although the present invention is explained with preferred embodiments, it should be understood that they are only for illustrating other than limiting the invention. Those who are skilled in the art, to which the invention is attributed, will appreciate that various modifications, alterations and modulations are possible without departing from the scope and spirit of the present invention as defined in the accompanying claims.

What is claimed is:

1. A method for manufacturing a three-dimensional model by depositing a material in accordance with shape data of the three-dimensional model using a variable deposition manufacturing apparatus that comprises a material feeder, an electrical melting device, a variable nozzle moved by a three-dimensional moving mechanism and a turntable adapted for rotating the three-dimensional model, the method comprising the steps of:

(a) designing the three-dimensional model and collecting shape data of the three-dimensional model;

(b) slicing the three-dimensional model into several layers in height;

(c) dividing each of the layers into several sublayers, each of said sublayers having an exterior shape so that one layer can be formed at once by depositing the sublayers using the variable nozzle;

(d) determining whether any of the sublayers requires a support, and positioning the support and adding shape data of the support to said shape data of the three-dimensional model when a sublayer requires the support;

(e) depositing a material in accordance with shape data in relation to a sublayer divided from one layer of the three-dimensional model by adjusting a width, thickness and slope of the material ejected from the variable nozzle;

(f) determining whether said one layer of the three-dimensional model has been completed;

(g) if said one layer of the three-dimensional model has not been completed as determined in step (f), repeating steps (d) through (f) for another sublayer divided from said one layer of the three-dimensional model;

(h) if said one layer of the three-dimensional model has been completed as determined in step (f), determining whether the three-dimensional model has been completed; and (i) if the three-dimensional model has not been completed as determined in step (h), repeating steps (c) through (h) for another layer sliced from the three-dimensional model.

2. A computer-aided design and computer aided manufacturing system used in manufacturing a three-dimensional model by depositing a material in accordance with shape data of the three-dimensional model using a variable deposition manufacturing apparatus that comprises a material feeder, an electrical melting device, a variable nozzle moved by a three-dimensional moving mechanism, and a turntable adapted for rotating the three-dimensional model, wherein the system comprises:

a main processor for designing the three-dimensional model and collecting shape data of the three-dimensional model, slicing the three-dimensional model into several layers in height, and dividing each of the layers into several sublayers so that a sublayer is formed by depositing a material at once;

a material-feeding controller for controlling the material feeder to adjust the quantity of material fed to the electrical melting device;

a nozzle controller for controlling material ejection from the variable nozzle;

a model position controller for controlling operation of the three-dimensional moving mechanism; and said main processor adapted for transmitting the shape data to said material-feeding controller, said nozzle controller and said model position controller so that these three controllers cooperate to form the three-dimensional model, wherein said three-dimensional moving mechanism comprises:

a first slider moved on a Y-directional rail, said first slider adapted to clamp said variable nozzle thereto;

a pair of sliders moved on a pair of X-directional rails, said pair of sliders moving said Y-directional rail in the X-direction; and one or more sliders moved on one or more Z-directional rails, said one or more sliders moving said turntable in the Z-direction.

3. The computer-aided design and computer aided manufacturing system according to claim 2, wherein the variable deposition manufacturing apparatus consists of one or more depositing lines, in which each of said depositing lines has said material feeder, said electrical melting device and said variable nozzle, respectively.

4. The computer-aided design and computer aided manufacturing system according to claim 3, wherein each of said depositing lines further comprises a nozzle heater for preventing a melt in said variable nozzle from being solidified.

5. The computer-aided design and computer aided manufacturing system according to claim 2, wherein the apparatus further comprises a nozzle heater for preventing a melt in said variable nozzle from being solidified.

6. The computer-aided design and computer aided manufacturing system according to claim 2, wherein said variable nozzle is comprised of two parts connected by a pivot with each other, in which a downstream part of said two parts is adapted to swing around said pivot to adjust an angle in relation with a upstream part of said two parts, by which an ejection angle of said downstream part is adjusted.

7. The computer-aided design and computer aided manufacturing system according to claim 6, wherein said downstream part of said variable nozzle comprises:

a thickness-adjusting panel adapted to be moved upward or downward to adjust the thickness of material ejected from said downstream part;

two width-adjusting panels adapted to be moved rightward or leftward to define right and left ends of an outlet of the downstream part of the variable nozzle; and two slope-adjusting panels adapted for defining slopes of said right and left ends of said outlet of said downstream part.

8. A variable deposition manufacturing apparatus used in manufacturing a three-dimensional model by depositing a material in accordance with shape data of the three-dimensional model, wherein the apparatus comprises:

a material feeder for feeding a material used in forming the three-dimensional model;

an electrical melting device for melting the material, said electrical melting device connected to said material feeder through a conduit;

a variable nozzle adapted for depositing the melted material in accordance with shape data of the three-dimensional model, said variable nozzle connected to said variable nozzle through a flow controller;

a three-dimensional moving mechanism for moving said variable nozzle in relation to the three-dimensional model; and a turntable adapted for rotating the three-dimensional model, wherein said three-dimensional moving mechanism comprises:

a first slider moved on a Y-directional rail, said first slider adapted to clamp said variable nozzle thereto;

a pair of sliders moved on a pair of X-directional rails, said pair of sliders moving said Y-directional rail in the X-direction; and one or more sliders moved on one or more Z-directional rails, said one or more sliders moving said turntable in the Z-direction.

9. The variable deposition manufacturing apparatus according to claim 8, wherein the apparatus consists of one or more depositing lines, in which each of said depositing lines has said material feeder, said electrical melting device and said variable nozzle, respectively.

10. The variable deposition manufacturing apparatus according to claim 9, wherein each of said depositing lines further comprises a nozzle heater for preventing a melt in said variable nozzle from being solidified.

11. The variable deposition manufacturing apparatus according to claim 9, wherein said variable nozzle is comprised of two parts connected by a pivot with each other, in which a downstream part of said two parts is adapted to swing around said pivot to adjust an angle in relation with a upstream part of said two parts, by which an ejection angle of said downstream part is adjusted.

12. The variable deposition manufacturing apparatus according to claim 11, wherein said downstream part of said variable nozzle comprises:

- a thickness-adjusting panel adapted to be moved upward or downward to adjust the thickness of material ejected from said downstream part;
- two width-adjusting panels adapted to be moved rightward or leftward to define right and left ends of an outlet of the downstream part of the variable nozzle; and
- two slope-adjusting panels adapted for defining slopes of said right and left ends of said outlet of said downstream part.

13. The variable deposition manufacturing apparatus according to claim 8, wherein the apparatus further comprises a nozzle heater for preventing a melt in said variable nozzle from being solidified.

14. The variable deposition manufacturing apparatus according to claim 8, wherein said variable nozzle is comprised of two parts connected by a pivot with each other, in which a downstream part of said two parts is adapted to swing around said pivot to adjust an angle in relation with a upstream part of said two parts, by which an ejection angle of said downstream part is adjusted.

15. The variable deposition manufacturing apparatus according to claim 14, wherein said downstream part of said variable nozzle comprises:

- a thickness-adjusting panel adapted to be moved upward or downward to adjust the thickness of material ejected from said downstream part;
- two width-adjusting panels adapted to be moved rightward or leftward to define right and left ends of an outlet of the downstream part of the variable nozzle; and
- two slope-adjusting panels adapted for defining slopes of said right and left ends of said outlet of said downstream part.

* * * * *